Dec. 12, 1961  J. TOYAMA  3,012,685
UNDERSLUNG TRUCK TIRE RACK
Filed Feb. 13, 1961
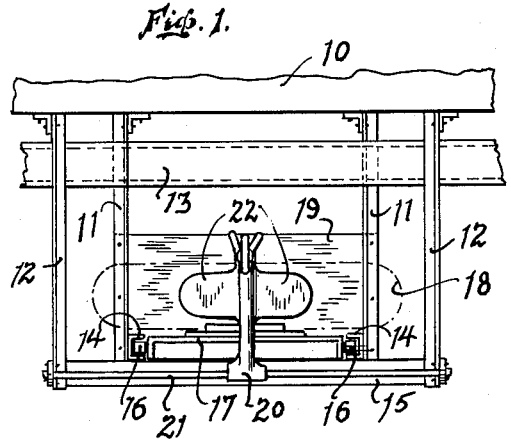
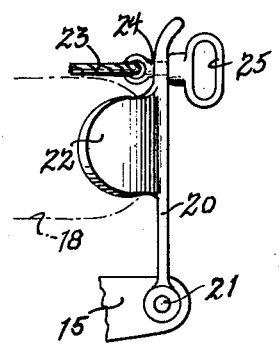
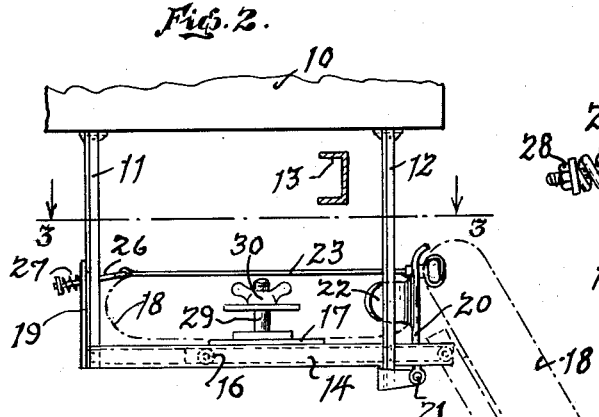
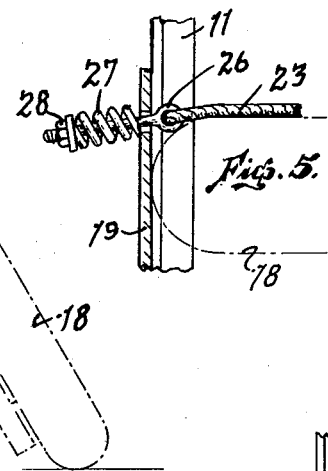
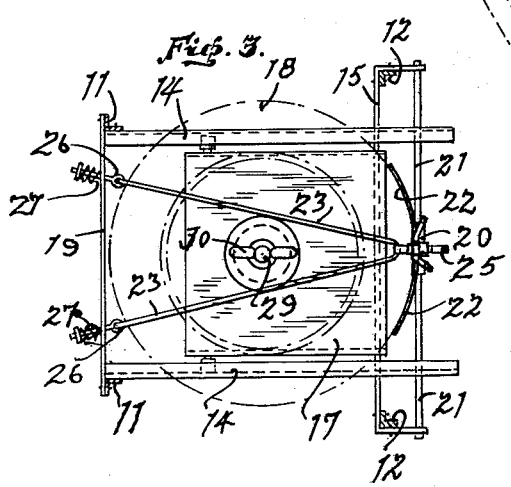
INVENTOR.
JAMES TOYAMA.
BY
ATTORNEY 3,012,685
UNDERSLUNG TRUCK TIRE RACK
James Toyama, 236 Capital St., Vallejo, Calif., assignor of one-half to Grace V. Bowling, Malden, Mo.
Filed Feb. 13, 1961, Ser. No. 88,832
3 Claims. (Cl. 214—454)

My present invention relates to an automotive vehicle and more particularly to an underslung frame for carrying the extra tire or spare wheel of a heavy truck trailer unit.

An object of the invention is to provide a practical and efficient spare tire and wheel carrying rack upon which the spare wheel and/or tire may be firmly held when not in use and easily and conveniently removed therefrom when required with a minimum of physical effort.

Another object of the invention is to provide an underslung spare wheel carrying rack for truck trailers having a novel securing means that can be released without special tools to permit access to the tire in a convenient and novel manner.

Other objces and advantages will be in part evident to those skilled in the art and in part pointed out hereinafter in connection with the accompanying drawing, wherein there is shown by way of illustration and not of limitation a preferred embodiment of the invention.

In the drawing, wherein like numerals refer to like parts throughout the several views:

FIGURE 1 is a front view of a tire rack constructed in accordance with the invention, FIGURE 2 is a side view of the tire rack as shown in FIGURE 1, FIGURE 3 is a top view of the tire rack as shown in FIGURE 1, and FIGURES 4, 5 and 6 are enlarged views showing details of the invention as shown in FIGURES 1, 2 and 3.

As shown in FIGURES 1, 2 and 3 of the accompanying drawing, my spare tire rack is hung from the underside of a trailer truck body, here designated by the numeral 10, by four downwardly extending stringers or supports 11 and 12. In addition to the fragmentary portion of the truck body 10, as here shown, there is also shown a portion of the channel iron frame or chassis 13 of the truck. The vertically extending stringers 11 are disposed inwardly in spaced relation from the side of the truck body 10 and are more closely spaced together than are the vertically extending stringers 12 that are disposed in spaced relation a short distance inwardly from the outside of the truck body 10. As here shown, the frame portion 13 of the truck chassis extends between the inner vertically extending stringers 11 and the outer stringers 12. At their lower ends the stringers 11 support two laterally extending channels or rails 14 which are supported at their outer ends by a laterally extending bar 15 that extends between the two outer stringers 12. Engaging the channels or rails 14 there is a pair of oppositely extending rollers 16 which are journalled upon a horizontal substantially square or rectangular carriage 17 that is adapted to carry a spare wheel and/or tire of the truck when placed thereupon. The tire of a wheel, here shown by dot and dash lines in these figures of the drawing, is identified by the numeral 18. Extending between the inner stringers 11 there is a vertically disposed plate or wall forming member 19 against which the tire of a wheel upon the carriage 17 will engage when finally secured upon the supporting rack. To maintain the tire 18 against the vertical plate or wall member 19 there is a pivotally mounted arm 20 which is hingedly carried by a horizontally extending pintle forming rod 21 that is secured at its ends between the vertical stringers 12. The clamping arm 20 has flared arcuately formed tire engaging wings which when the arm is in its operative position, as here shown, will be held in contact with the outer periphery of the tire 18 by means of a tie forming cable 23.

The clamping arm 20, as shown in more detail in FIGURE 4 of the drawing, is arranged to swing upwardly in a vertical plane about the pintle forming rod 21 and at its upper end it is forked or bifurcated to provide a vertically extending slot into which a clevis 24 may be inserted when in its operative position. This clevis 24 has a hand grip portion 25 by which the tie cable 23 is drawn and held in retaining engagement with the tire 18.

As indicated and illustrated in more detail in FIGURE 5 of the drawing the tie cable 23 consists of a continuous length which is anchored at its inner ends to eyebolts 26 that extend through the wall forming plate 19 and carry compression springs 27 which are held against the outer side of the wall forming plate 19 by means of threaded nuts 28 at the outer ends thereof. The tire and wheel supporting carriage 17 may be provided with a centrally extending stud or spindle 29 which will extend through the wheel hub and at its upper end there is threaded a wing nut 30.

As shown in FIGURE 6 of the drawing, the tire and/or wheel supporting carriage 17 has depending flanges 31 upon which the rollers 16 are mounted by stud shafts 32.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a wheel and tire carrying rack for truck trailers and the like, the combination of a plurality of stringers secured to and extending downwardly from the underside of a truck trailer body, a horizontally and laterally extending trackway having spaced rails supported by the lower ends of said stringers, a wheel and tire supporting carriage having rail engaging wheels at one end and movable outwardly from the side of the truck trailer, a transverse bar at the outer end of said trackway for supporting the outer end of said carriage, a hinged gate like member swingable in a vertical plane having a tire engaging portion for engagement with the tire of a wheel placed upon said carriage, a wall forming plate carried by said stringers with which the tire of a wheel upon said carriage will engage, a pair of clevises carried by said plate at an elevation in alignment with the upper surface of the tire of a wheel when placed upon said carriage, a cable connected at its ends between said clevises forming a loop over said tire, and means on the loop of said length of cable adapted and arranged to engage said gate like member and retain said gate like member in its tire retaining position.

2. In a wheel and tire carrying rack for truck trailers and the like, the combination of a plurality of stringers secured to and extending downwardly from the underside of a truck trailer body, a horizontally and laterally extending trackway having spaced rails supported by the lower ends of said stringers, a wheel and tire supporting carriage having rail engaging wheels at one end and movable outwardly from the side of the trailer body, a transverse bar at the outer end of said trackway for supporting the outer end of said carriage, a hinged gate like member swingable in a vertical plane having an arcuate tire engaging portion at its upper end for engagement with the tire of a wheel placed upon said carriage, a vertical wall forming plate carried by two of said stringers with which the tire of a wheel upon said carriage will engage, a pair of spring biased clevises carried by said plate at an elevation in alignment with the upper surface of the tire of a wheel when placed upon said carriage, a flexible cable connected at its ends between said clevises and having a length sufficient to form a loop over said tire, and means on the loop of said length of cable adapted and arranged to engage said gate like member and retain said gate like member in its tire retaining position, said hinged gate like member having spaced horns between which said last means is positioned when in use.

3. In a spare wheel and tire carrying rack for truck trailers and the like, the combination of a wheel and tire supporting carriage mounted upon horizontally extending rails for movement laterally of a truck body, a wall forming means at the inner end of said rails against which a tire of a wheel will engage when secured upon said carriage, a hinged gate member mounted upon a horizontal pintle located below and at the outer end of said rails, said gate member having an arcuate tire engaging portion at its upper end for engagement with the tire of a wheel when secured upon said carriage, an elastic tie means secured at its inner end to said wall forming means, said hinged gate member having a forked upper end, and means carried by said elastic tie means engageable in the forked end of said hinge member for securing said tie means and said hinged gate member in cooperating relation to secure the spare wheel and tire upon said carriage.

References Cited in the file of this patent

UNITED STATES PATENTS

| | | |
|---|---|---|
| 2,063,092 | Groden | Dec. 8, 1936 |
| 2,091,071 | Girl | Aug. 24, 1937 |